US010979477B1

(12) United States Patent
Cabrido et al.

(10) Patent No.: US 10,979,477 B1
(45) Date of Patent: Apr. 13, 2021

(54) TIME SYNCHRONIZATION BETWEEN LIVE VIDEO STREAMING AND LIVE METADATA

(71) Applicant: Amazon Technologies, Inc., Seattle, WA (US)

(72) Inventors: Jeremy Matthew Cabrido, Seattle, WA (US); Vinay Raj, Los Gatos, CA (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/364,622

(22) Filed: Mar. 26, 2019

(51) Int. Cl.
G06F 15/16 (2006.01)
H04L 29/06 (2006.01)
H04N 21/242 (2011.01)
H04N 21/43 (2011.01)

(52) U.S. Cl.
CPC ........ *H04L 65/608* (2013.01); *H04L 65/4092* (2013.01); *H04L 65/607* (2013.01); *H04N 21/242* (2013.01); *H04N 21/4302* (2013.01)

(58) Field of Classification Search
None
See application file for complete search history.

(56) References Cited

U.S. PATENT DOCUMENTS

| | | | |
|---|---|---|---|
| 5,694,334 A * | 12/1997 | Donahue | H04L 29/06 348/E7.071 |
| 9,866,459 B1 * | 1/2018 | Joliveau | H04L 41/0654 |
| 10,397,636 B1 * | 8/2019 | Kalva | H04N 21/6547 |
| 10,536,741 B1 * | 1/2020 | Madison | H04N 21/242 |
| 2013/0091251 A1 * | 4/2013 | Walker | H04N 21/6125 709/219 |
| 2015/0071458 A1 * | 3/2015 | Sullivan | H04N 21/4825 381/77 |
| 2016/0255133 A1 * | 9/2016 | Nagaraj | H04N 21/4384 709/219 |
| 2018/0063590 A1 * | 3/2018 | Her | H04N 21/8146 |
| 2018/0199075 A1 * | 7/2018 | Wang | H04N 21/2343 |
| 2019/0068665 A1 * | 2/2019 | Kieft | H04L 65/604 |
| 2019/0104326 A1 * | 4/2019 | Stockhammer | H04L 67/02 |

* cited by examiner

Primary Examiner — Phyllis A Book
(74) Attorney, Agent, or Firm — Weaver Austin Villeneuve & Sampson LLP (57) ABSTRACT

Techniques are described for synchronizing video of a live event with separately generated metadata relating to the live event. Timing information representing a delay associated with the encoding and packaging pipeline is determined for each origin that produces a set of content streams, and then provided in the form of a synchronization offset in the client manifest for various streaming technologies. The client device requests the metadata, and synchronizes the metadata with content segments using timing information associated with each and the synchronization offset communicated in the manifest.

22 Claims, 5 Drawing Sheets

TIME SYNCHRONIZATION BETWEEN LIVE VIDEO STREAMING AND LIVE METADATA

BACKGROUND

Some online content services have recently begun providing metadata for presentation on client devices in conjunction with video content (e.g., as part of an interactive overlay). In cases where the video content depicts a live event (e.g., a sporting event) it is important to ensure that presentation of metadata is appropriately synchronized with the live video. If the metadata are presented too early, there is a risk of a "spoiler" effect in which the metadata describe an event before the event is depicted in the video. On the other hand, if the metadata are presented too late, the information loses its relevance to what is happening on the screen. In either case, the user experience is negatively affected. One of the challenges is that the video content and the metadata are typically generated in separate, unsynchronized pipelines.

DETAILED DESCRIPTION

This disclosure describes techniques for synchronizing video of a live event with separately generated metadata relating to the live event. These techniques take advantage of the fact that the delay between the time at which source video content is captured and the time at which corresponding segments of the resulting video content streams become available (e.g., to a packager) may be treated as substantially constant for a given origin stack. Timing information relating to this delay is determined for each origin that produces a set of content streams, and then provided in the form of a synchronization offset in the manifest that a client device uses to request segments of the content streams. The client device separately requests the metadata, and synchronizes the metadata with content segments using timing information associated with each and the synchronization offset communicated in the manifest. An example may be instructive.

Figure 1:
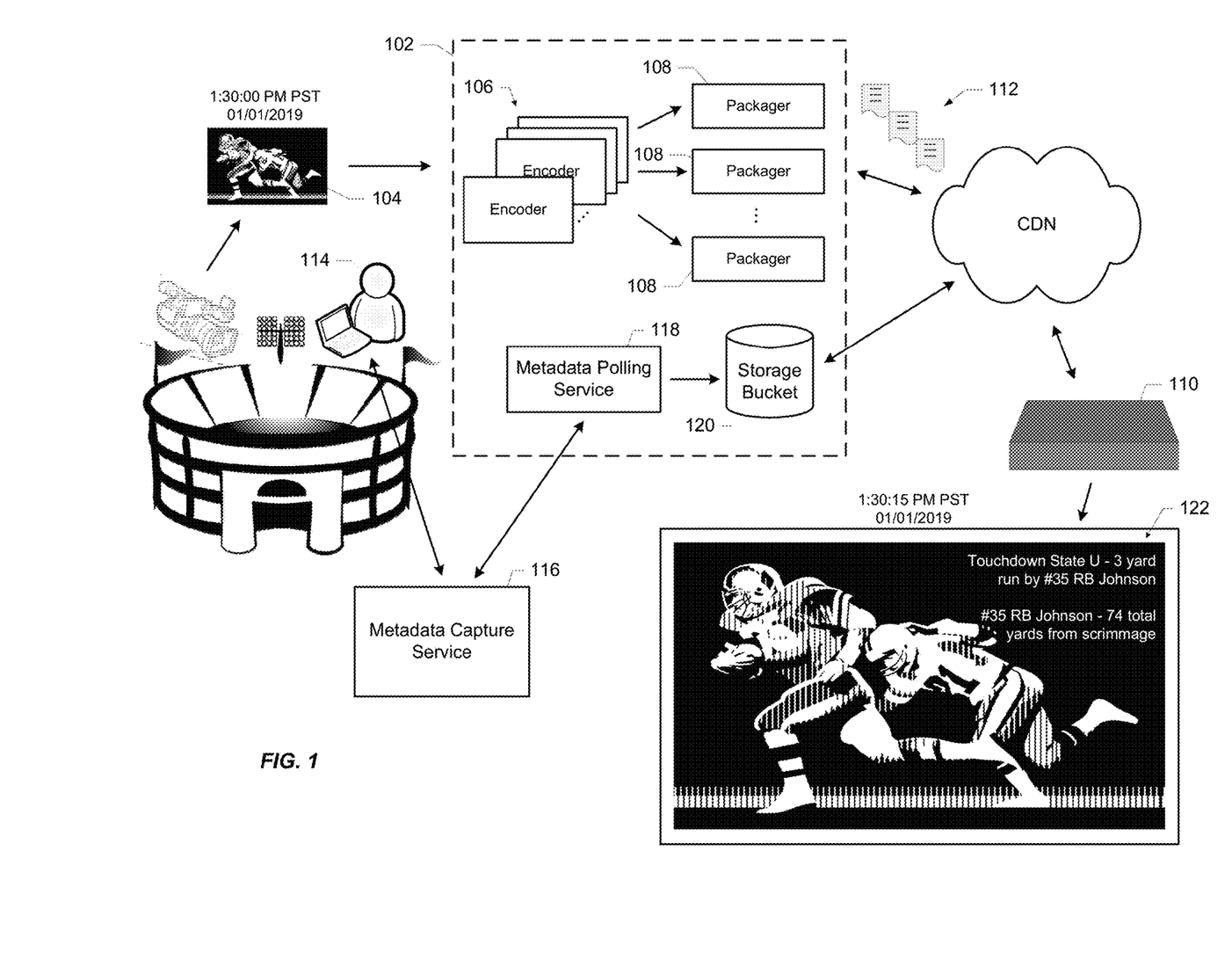
FIG. 1 illustrates an example of a particular class of implementations for synchronizing video with metadata as enabled by the present disclosure.

FIG. 1 shows a video content service 102 that receives a source video feed 104 from one or more cameras at a stadium in which a football game is being played. Service 102 encodes (using encoders 106) and packages (using packagers 108) the captured video for delivery as a plurality of live streams that include different quality-level and bitrate versions of the content delivered according to a number of streaming protocols including, for example, HTTP Live Streaming (HLS), Dynamic Adaptive Streaming over HTTP (DASH), HTTP Dynamic Streaming (HDS from Adobe), and Smooth Streaming. Live streaming clients (e.g., set top box 110) consume the live content via a content delivery network (CDN) using live manifests 112 that are periodically made available by service 102 as additional content is encoded and packaged.

As the game progresses, one or more human operators 114 at the stadium log events (e.g., a touchdown, a sack, etc.) and enter statistics (e.g., cumulative yards, number of receptions, etc.) for metadata capture service 116. Content service 102 acquires these metadata from metadata service 116 with metadata polling service 118 and publishes the metadata (possibly after some manipulation or transformation of the metadata) in storage bucket 120. The metadata may be then be acquired by client devices for presentation with the live content as illustrated (text 122).

Because, in this example, the video stream(s) and the metadata consumed by client device 110 are generated in different pipelines (that may be under the control of independent entities), it is unlikely that the video content in the former is synchronized or otherwise correlated with the information in the latter. As will be appreciated, this has the potential for some undesirable results. For example, suppose the video encoding and packaging pipeline is characterized by a delay of 10 seconds from the time video is captured at the venue until corresponding video segments of the video streams become available. Also suppose that the information in the metadata pipeline is published within 5-10 seconds. This disparity could result in the onscreen presentation of metadata to the end user several seconds before a corresponding event is actually depicted in the video, e.g., a touchdown might be announced before the snap! Needless to say, this kind of "spoiler" effect can have an undesirable and highly negative impact on the user experience of metadata information.

One approach to is to enforce a constant delay before allowing the publication of metadata or the onscreen presentation of metadata on the client, with the delay being long enough to ensure that the metadata are unlikely to be presented before the corresponding video. However, given the variability across different types of encoding and packaging pipelines a universal value for this constant delay would not be appropriate. That is, depending on how the source video is encoded and packaged, the delay associated with these activities could range from about 3 to 5 seconds (e.g., for a hardware encode at the venue) to about 15 seconds (e.g., for a cloud-based encode). If a constant delay is conservatively chosen based on the longest encode time anticipated, then metadata associated with a video stream generated with a faster encode might be undesirably delayed thereby compromising customer experiences. This problem may be exacerbated by delays in the metadata pipeline such as when, for example, a human logger waits to enter particular metadata relating to an event.

Alternatively, human operators can be employed to set a delay, observe the degree of synchronization between the video and metadata in real time, and manually adjust the delay as necessary. However, given the potentially large number of simultaneous live broadcasts, redundant stream sources, and content formats, such a manual and labor intensive approach is expensive and impracticable.

Therefore, according to various implementations enabled by the present disclosure, a synchronization offset is determined for each origin stack and its encoding/packaging pipeline. The offset is then communicated to client devices in the manifests used by the clients to request segments of the video content streams (e.g., manifests 112). Logic on the client devices uses the synchronization offset along with timing information associated with the video segments and the metadata to synchronize their presentation on the associated display.

According to a specific implementation, the synchronization offset is determined based on the time at which the source video is captured (e.g., as represented by a timestamp or time reference assigned by the video production system at the venue) and the time at which a corresponding segment of an encoded video stream becomes available (e.g., the segmentAvailableTime as defined by the DASH standard). The offset can then be communicated to the client without requiring human intervention as the client is beginning its streaming session by including the offset in the manifest (e.g., by specifying a custom value under a conformant and standard tag in a DASH manifest).

The synchronization offset might only need to be determined once (e.g., at the beginning of the encoding and packaging of the source video) because the overall delay of the pipeline typically remains substantially constant throughout the streaming of the live event. Alternatively, the offset may be determined more than once to account for possible drift in the overall delay that might occur over time. In the latter case, updated values of the offset can be communicated in manifest updates sent to clients as new segments are generated. And because the synchronization offset is determined for each origin stack that generates a set of streams, its value reflects timing that is uniquely appropriate for that stack. In this way, video content depicting a live event and separately generated metadata for the same live event can be synchronized for presentation on client devices in a reliable and scalable manner.

Figure 2:
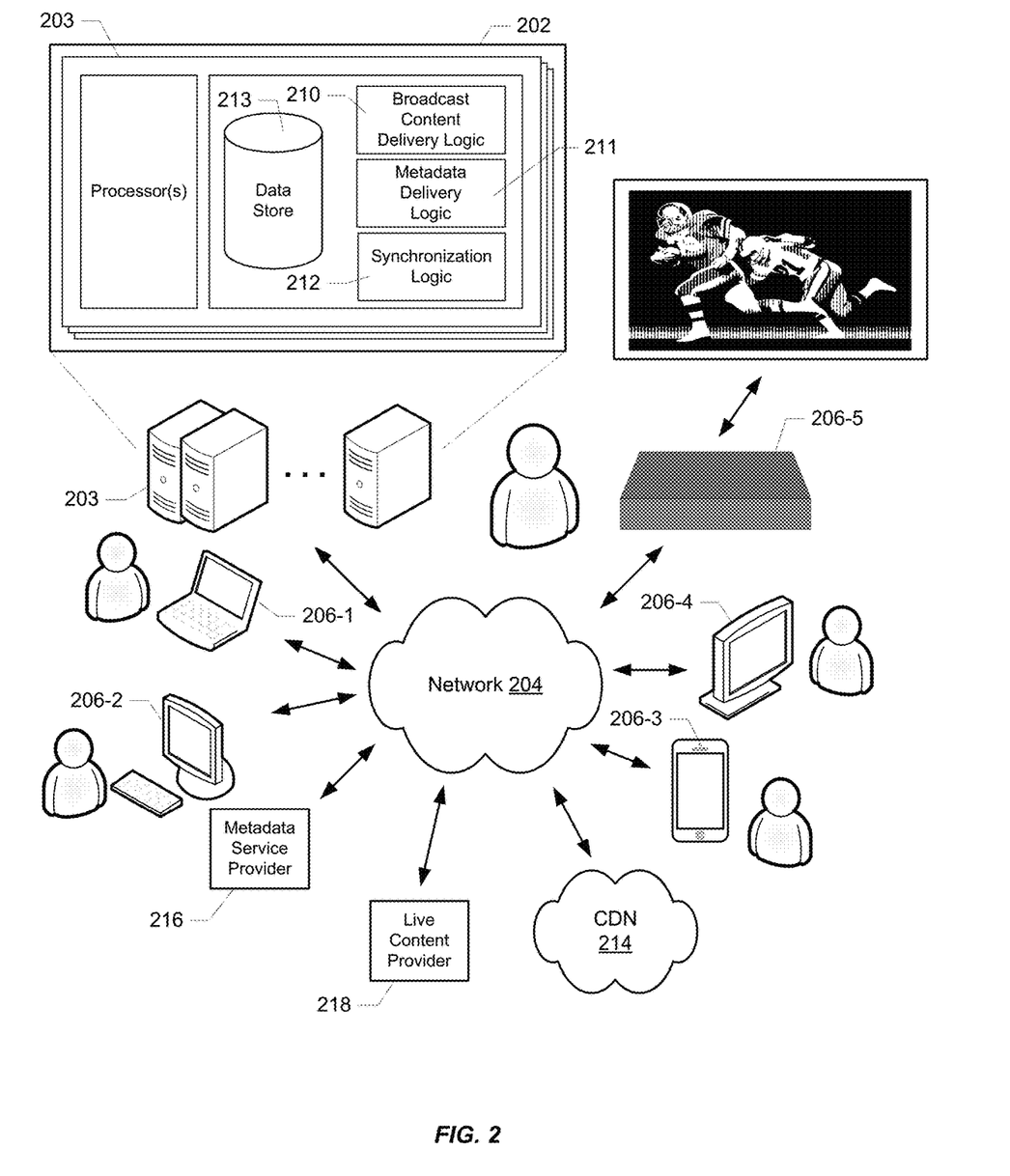
FIG. 2 illustrates an example of a computing environment in which implementations enabled by the present disclosure may be practiced.

FIG. 2 illustrates an example of a computing environment in which a video content service 202 provides broadcast video content and corresponding metadata via network 204 to a variety of client devices (206-1 through 206-5) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content and metadata provided by service 202. Such devices may include, for example, mobile devices (e.g., cell phones, smart phones, and tablets), personal computers (e.g., laptops and desktops), set top boxes (e.g., for cable, satellite, and online systems), smart televisions, digital assistant devices, gaming consoles, wearable computing devices (e.g., smart watches or smart glasses), etc.

At least some of the examples described herein contemplate implementations based on computing models that enable ubiquitous, convenient, on-demand network access to a pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it is integrated with the platform(s) that provides both broadcast content and metadata to client devices. However, it will be understood that content service 202 may provide access to content in conjunction with one or more content delivery networks (e.g., CDN 214) that may or may not be independent of content service 202. In addition, the source(s) of one or both of the broadcast content and the corresponding metadata may be independent of or integrated to various degrees with content service 202 (e.g., as represented by metadata provider server 216 and live content provider 218). The range of variations known to those of skill in the art are contemplated to be within the scope of this disclosure.

In addition to broadcast content delivery logic 210 (which facilitates various aspects of content delivery to client devices 206), content service 202 may include metadata delivery logic 211 that facilitates the publication of metadata for consumption by client devices, and synchronization logic 212 that supports the synchronization of live video content with corresponding metadata as enabled by the present disclosure.

In addition to providing access to video content, content service 202 may also include a variety of information related to the video content (e.g., broadcast content, and associated metadata and manifests in data store 213 to which service 202 provides access). Alternatively, such information associated with and/or about the content, as well as the content itself may be provided and/or hosted by one or more separate platforms, e.g., CDN 214 or remote cloud storage. It should be noted that, while logic 210, 211, and 212, and data store 213 are shown as integrated with content service 202, implementations are contemplated in which some or all of these operate remotely from the associated content service, and/or are under the control of an independent or more loosely integrated entity. From these examples, those of skill in the art will understand the diversity of use cases to which the techniques described herein are applicable.

Figure 3:
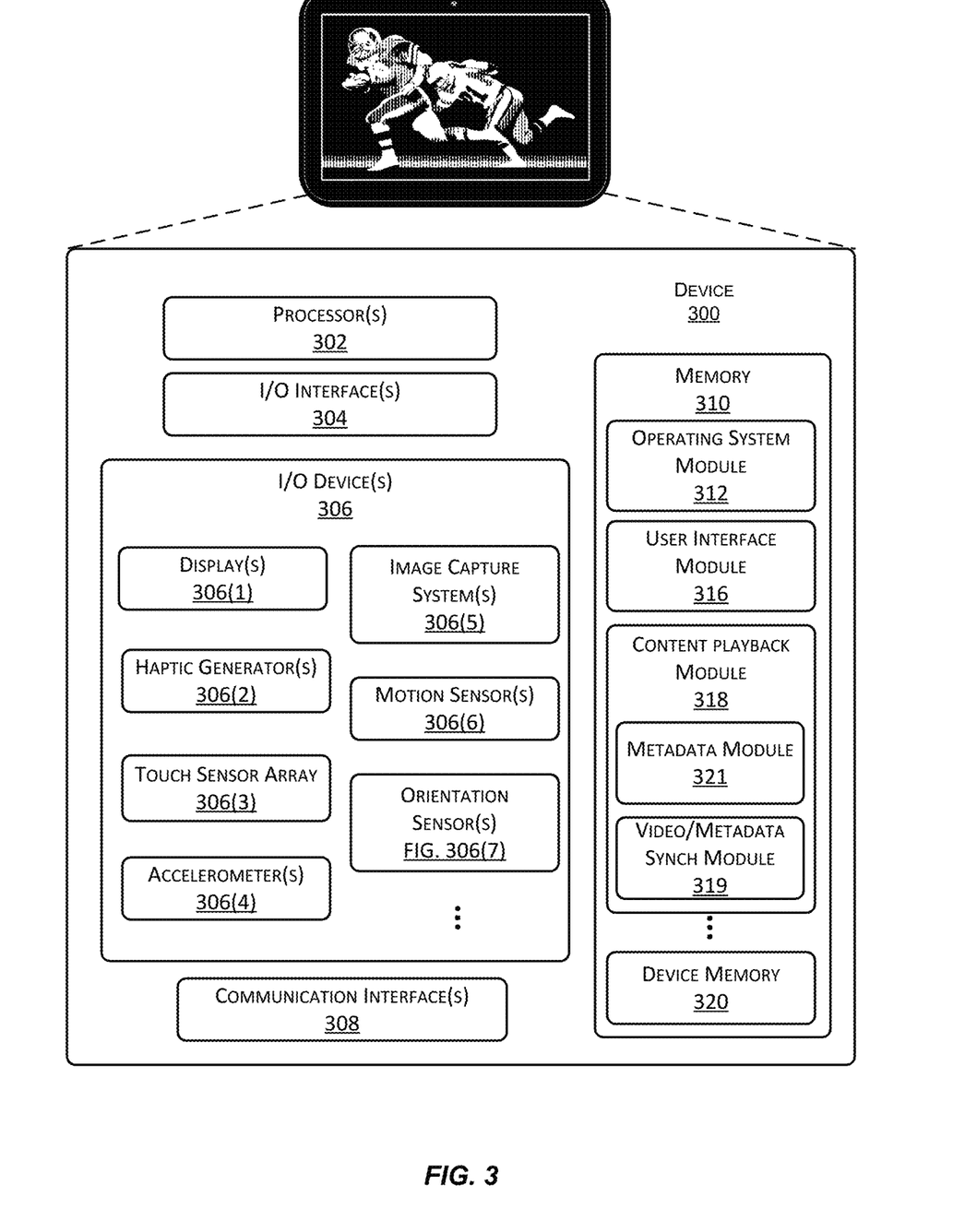
FIG. 3 illustrates an example of a client device with which implementations enabled by the present disclosure may be practiced.

A block diagram of an example of a client device 300 suitable for use with various implementations is shown in FIG. 3. As mentioned above, it should be understood that device 300 may be any of a wide variety of device types. Device 300 (depicted as a tablet device) includes one or more single or multi-core processors 302 configured to execute stored instructions (e.g., in device memory 320). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 304 is coupled to one or more I/O devices 306 which may or may not be integrated with client device 300.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software (not shown) that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content playback module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

The client side logic used for acquiring metadata (represented by metadata module 321), and synchronizing live video content with the metadata (represented by video/metadata synchronization module 319) may be implemented in a variety of ways, e.g., in hardware, software, and/or firmware. For example, at least some of this functionality may be implemented as part of the code of a media player operating on device 300 (e.g., content playback module 318). Alternatively, module 319 and/or module 321 may be implemented separately from and interact with the device's media player, web browser, mobile app, decoder, etc.

Suitable variations and alternatives will be apparent to those of skill in the art. It will also be understood that device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

Figure 4:
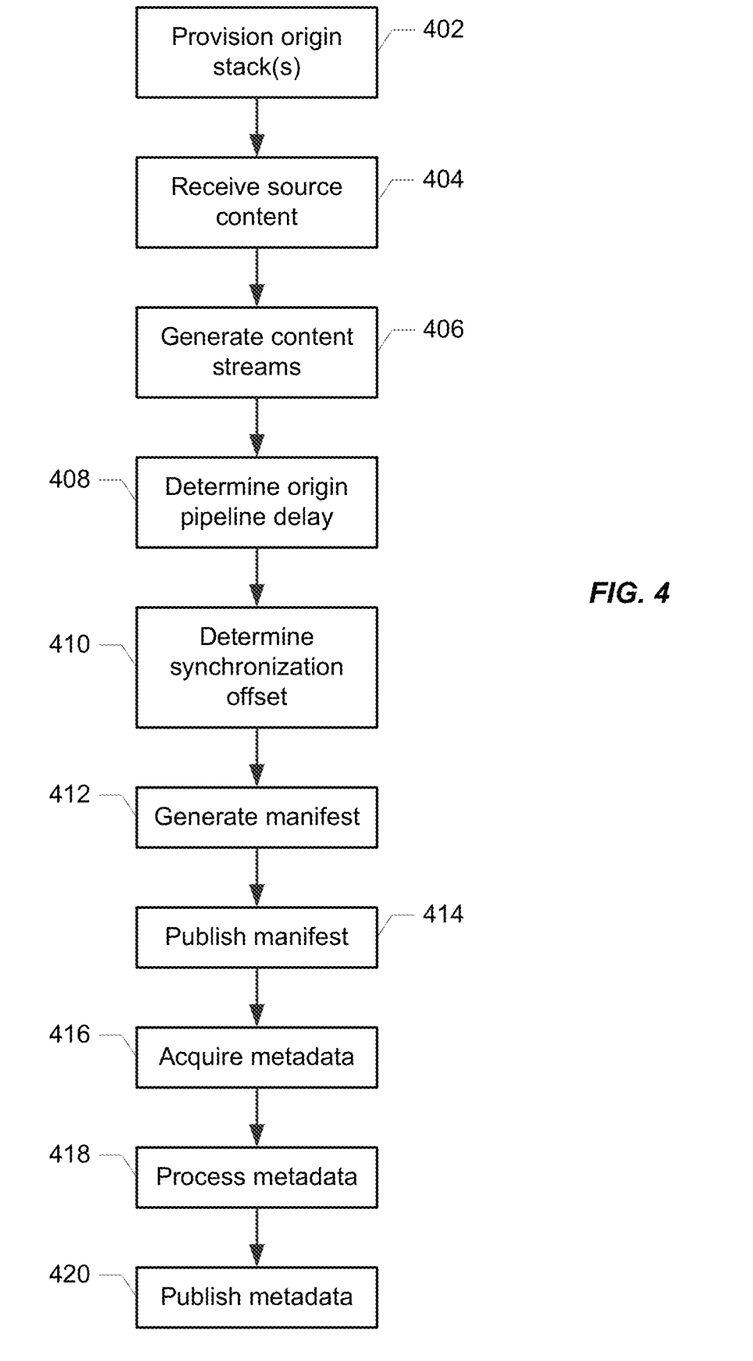
FIG. 4 is a flowchart illustrating operation of a class of implementations enabled by the present disclosure.

The delivery of content to a client device according to a particular implementation is illustrated in the flow chart of FIG. 4. It should be noted that this and other examples described herein may be employed with any of a variety of video and audio codecs including, for example, MPEG-1, MPEG-2, MPEG-4 Part 2, VC-1, H.263, VP8, VP9, Daala, H.264 (AVC), and H.265 (HEVC). Moreover, the basic principles described herein may be employed with any of a variety of streaming protocols by which client devices consume content including, for example, Apple's HTTP Live Streaming (HLS), Microsoft's Smooth Streaming, Adobe's HTTP Dynamic Streaming, Dynamic Adaptive Streaming over HTTP (DASH), etc.

Referring to FIG. 4, in preparation for the streaming of broadcast content, a content service provisions multiple, redundant origin stacks (402), each of which includes the necessary set of transcoding, digital rights management (DRM), and media processing hardware and software resources for encoding and packaging source content and making the content available for streaming to client devices (e.g., via one or more CDNs). The origin stacks are preferably isolated from each other to some degree (e.g., different hardware, co-location facilities, geographic regions, etc.) to ensure reliable delivery of the broadcast content.

Each origin stack receives source content (404) and generates a set of video content streams (406). As discussed above, the source content may depict a live event such as a sporting event or a concert. The video and audio components of the source content may be captured using cameras and microphones and a variety of other technologies to generate various auditory and/or visual elements of the content. Alternatively, the source content might not relate to a live event, but instead might include video content that is presented according to a schedule such as, for example, a TV network channel or a premium movie channel.

For each origin stack a delay is determined that is associated with its encoding and packaging pipeline (408). This delay represents a substantially constant time difference between one point in time associated with generation or capture of the source video, and another point in time representing availability of a corresponding segment of one or more of the resulting content streams.

The first point in time (associated with generation or capture of the source video) may be derived in different ways. For example, it might be represented by a timestamp or time reference assigned by the video production system at the venue. This could be a timestamp assigned by a camera capturing the source video, or by some other system component based on a master clock synchronizing the various components of the video production system (e.g., MPEG-2 presentation times, sideband information or metadata). Alternatively, the first point in time might be further downstream such as, for example, a timestamp representing when the source video is received by an encoder. As will be appreciated, in the former case, the first point in time might be consistent across origin stacks whereas, in the latter case, it might be different.

The second point in time (representing availability of a corresponding segment of a content stream) may also vary depending on the implementation. For example, this point in time may be represented by a timestamp or calculated time value assigned by a component of the origin stack's encoding and packaging pipeline, e.g., a component at or near the end of the pipeline. According to a particular class of implementations, the second point in time is represented by a timestamp or calculated time value associated with a packager of the origin stack. According to a subset of these implementations, the timestamp or calculated time value represents the time at which a corresponding segment of the content is made available to the packager. For example, in the context of a DASH implementation, the timestamp used might be the segmentAvailableTime from a media package which is calculated by taking the packager's availabilityStartTime (a timestamp representing when the packager first started up) and offsetting that value based on the current video fragment and frame. In the context of HLS the venue time of the program data time might be used.

A synchronization offset for each origin stack is then determined based on the delay (410). This might be as straightforward as using the delay as the offset. However, implementations are contemplated in which these values are not necessarily the same. For example, to get the synchronization offset value, the value for the delay might be increased or decreased. This might be done to account for the fact that the delay might not represent the entire time between capture of the source video and publication of the corresponding segments of the content streams generated by the origin stack. For example, if the delay represents the time between receipt of the source video at the encoder and the availability of corresponding segments to the packager, the synchronization offset might be increased by some amount to account for time between capture of the source video and arrival at the encoder and/or time between availability of a segment to the packager and publication of that segment to the CDN. Other variations on this theme that attempt to have the synchronization offset more accurately represent a substantially constant component of the delay associated with the origin stack will be appreciated by those of skill in the art.

For each origin stack, manifest information is generated that is configured to enable client devices to request the segments of the content streams (412). According to a particular implementation, the manifest information includes the synchronization offset. The synchronization offset may be communicated to a client device in the manifest in a variety of ways. For example, the offset might be included as a custom value of a conformant and standard tag defined by the relevant streaming protocol (e.g., HLS, DASH, Smooth Streaming, etc.). Alternatively, the offset might be introduced as new syntax representing new functionality of the relevant streaming protocol.

According to a particular implementation relating to DASH, the offset is communicated using an existing manifest mechanism designed to signal aperiodic information to the DASH client. One example of such a mechanism is the tag "urn:dvb:iptv:cpm:2014." Other suitable mechanisms for DASH implementations and for implementations relating to other streaming protocols may be employed. For example, the <EventStream> and <Event> syntaxes, or SupplementalProperty with @schemeIdUri="urn:scte:dash:utctime."

The manifest information (including the synchronization offset) is then provided to client devices in connection with the establishment of sessions by those devices for consuming one or more of the content streams (414). As will be appreciated, as the broadcast content continues to be generated, updates to the manifests are provided to the client devices to reflect the newly available content segments. The synchronization offset may be included in such manifest updates. Alternatively, and because the delay associated with the encoding and packaging of the source video typically remains substantially constant for the duration of the presentation, the offset might only be included in the initial manifest sent to the clients at the beginning of their respective sessions. On the other hand, implementations are contemplated in which the delay might drift over time, particularly for longer presentations. In such cases, it may be advantageous to periodically determine the delay and the synchronization offset to account for any such drift, and to communicate new values for the offset with one or more manifest updates.

In parallel with the generation of content streams by the origin stacks, metadata representing the subject matter depicted in the broadcast content is generated in a separate pipeline and acquired by the content service (416). These metadata may include a wide variety of information about the subject matter of the content and may be generated and/or acquired in a wide variety of ways. For example, for a live event such as a sporting event, the metadata might include information about individual events occurring at specific times during the live event (e.g., specific touchdowns, tackles, or pass completions associated with individual plays of a football game). The metadata might also include other types of information that relate to the live event more generally (e.g., accumulated game statistics, roster and player information, etc.). The metadata might also include information originating from other sources such as, for example, social media posts, live chat between viewers, etc.

Again referring to the use case of a live sporting event, the metadata might be generated by human operators at the sporting venue and/or viewing the source content in real time. The operators might be using specialized metadata logging software that timestamps metadata entries when, for example, the operator begins typing a new entry. These metadata are uploaded to a metadata capture service and acquired by the content service by periodically polling the metadata capture service. The content service might perform its own processing of the metadata (418) including, for example, augmenting and formatting the metadata for presentation in conjunction with the content streams. The processed metadata (including any timing information) are then published for consumption by client devices (420), e.g., in an S3 bucket on an Amazon Web Services platform. According to a specific implementation, the published metadata are transmitted to clients as JSON-formatted responses that inform the client devices how to render and display the metadata in a user interface associated with the broadcast content (e.g., as an overlay).

As mentioned above, the metadata entries received from the metadata capture service may include explicit timing information based, for example, on timestamps inserted by the metadata logging software as the metadata are entered by a human operator. Alternatively, the timing information might be inferred in a variety of ways. For example, where metadata entries do not have associated timing information, the time at which the content service either polls the metadata capture service or receives a metadata entry can be used as a timestamp to associate with the corresponding metadata entries before publication. While this timing is later than the time at which the metadata are originally generated, the use of this timing information for synchronization as enabled by the present disclosure will be unlikely to result in a spoiler event.

According to some implementations, timing information for metadata entries may be inferred from the broadcast content itself. For example, before, after, or in conjunction with encoding of the source video, audio data or caption information associated with the video may be processed to identify keywords that correspond to similar keywords in metadata entries, with the timing information for the metadata entries being inferred from timing information of the corresponding video. In another example, image frames of the video may be processed using image processing techniques to identify objects or events in the image frames that can be correlated with metadata entries. For example, the image frames for a sporting event may include a game clock. Or a series of frames might depict a scoring event such as a touchdown or a home run. Such objects or events can then be identified in the text of corresponding metadata entries to establish a correlation between the entries and the video.

It should be noted that, in cases where a correlation between a metadata entry and a video segment has been determined, use of a synchronization offset as described herein may not be necessary to facilitate synchronization of the metadata and the content. That is, if the timing information inferred for a metadata entry corresponds, for example, to the presentation timestamp of a particular segment of a content stream, then the timing information of the metadata and the segments may be directly compared without having to offset either value. In such cases, the timing information associated with a particular metadata entry may be identified to the client logic as either requiring or not requiring use of the offset.

As will be discussed, logic on the client devices uses the synchronization offset along with timing information associated with the video segments and the processed metadata to synchronize their presentation on the associated display. In this way, the timing of the presentation of the metadata takes into account the encoding and packaging pipeline delay for the relevant origin stack so that the metadata are timely presented while reducing the risk of possible spoilers. Moreover, because the synchronization offset is specific to each origin stack, migration of a client device to another origin stack (e.g., for load balancing or failure recovery) automatically results in a new synchronization offset being provided to the client that accurately reflects the delay associated with the new origin stack.

Figure 5:
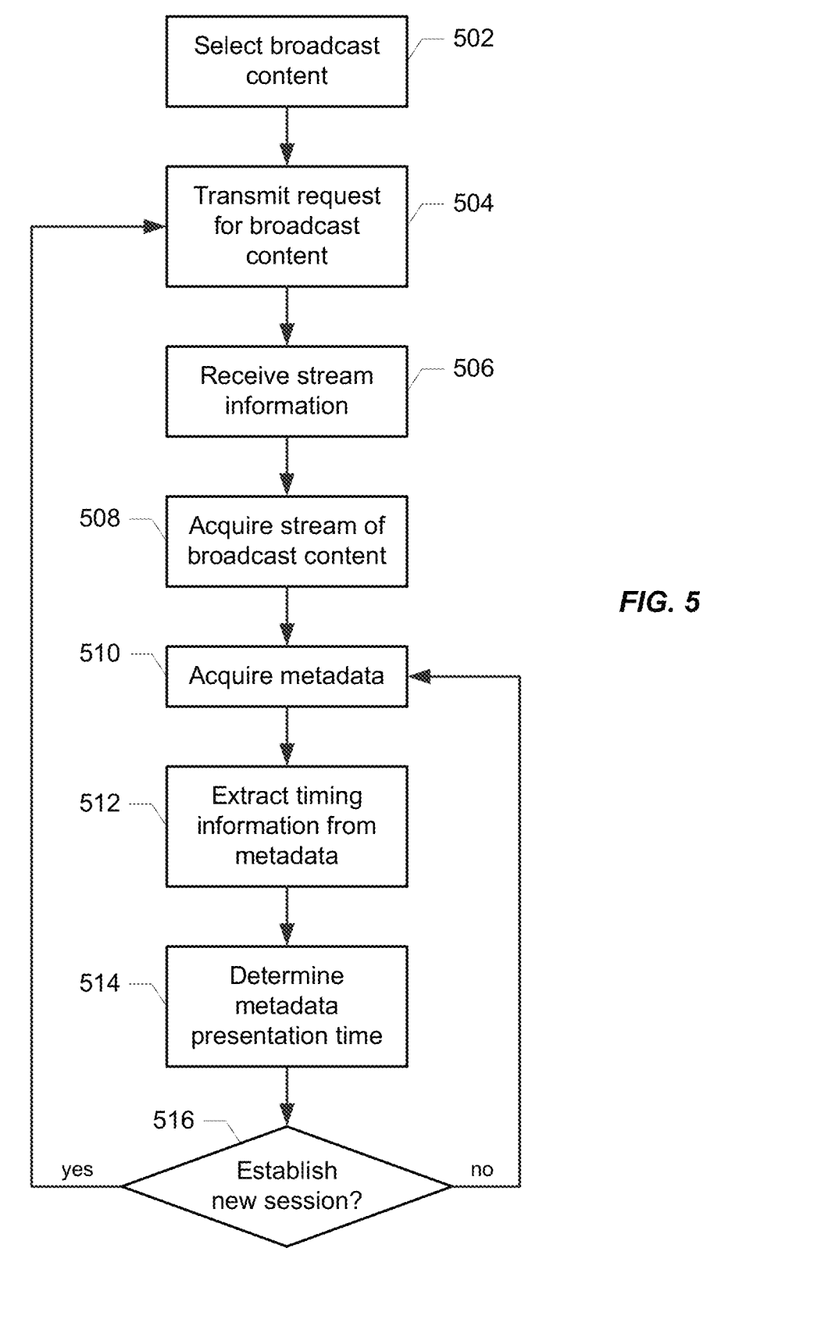
FIG. 5 is another flowchart illustrating operation of a class of implementations enabled by the present disclosure.

FIG. 5 is a flowchart illustrating the synchronization of content and metadata from the perspective of a client device. When a user wants to connect with a content service using a client device, the connection is typically achieved through some kind of login process to the service in a user interface presented on the client device. Content playback is provided, for example, via a resident media player, web browser, or mobile app. Access to content over the Internet is typically governed by a DRM system such as Google's Widevine, Microsoft's PlayReady, Apple's FairPlay, or Sony's OpenMG to name a few representative examples. The video content may be delivered using an adaptive bit rate streaming technique such as, for example, DASH, HLS, or Smooth Streaming, to name a few representative examples.

Referring now to FIG. 5, when broadcast content is selected in a user interface on a client device (502), a request for the content is sent to the corresponding content service (504). The content service provides the client device with the information the client device needs to acquire a stream of the content (506). This may include, for example, DRM licenses, a decryption key, content metadata, and manifest information about where the client can request the fragments of the selected content at various resolutions. The client device then acquires a stream of the video content using the information received from the content service (508). As discussed above, the manifest information acquired by the client device includes a synchronization offset for use by the client device in synchronizing presentation of the broadcast content with separately generated metadata.

The information received by the client device also includes information to support acquisition of metadata for presentation with the broadcast content (e.g., the URL of the S3 bucket to which the metadata are published). The client device uses this information periodically to poll the source of the metadata for any newly published metadata (510). Timing information (e.g., timestamps) is extracted from or generated for the received metadata entries (512). As discussed above, this timing information may be based on timestamps generated in conjunction with the initial logging of the metadata, or inferred/generated at some later point.

According to a specific implementation, the client device initially receives a pointer (e.g., a URL) in the metadata associated with the broadcast content from which the client device requests and receives all of the metadata that has been generated to that point in the broadcast as well as a new pointer to the next update of the metadata. With each new update, a new pointer is provided to the next update.

Logic on the client device (which may be part of the media player) uses the timing information associated with the metadata entries, timing information associated with content segments, and the synchronization offset to determine when to present particular metadata information with corresponding video segments on the display of the client device (514). This determination may vary considerably depending on the nature of these various pieces of information.

For example, as discussed above, the synchronization offset may represent all or some portion of the time between the capture of the source video and the segmentAvailableTime for the corresponding content segments. If, in such a case, the timing information associated with the metadata entries can be assumed to be closely aligned with source video capture (e.g., the metadata logging software used at the venue assigns reliable timestamps), synchronization might be achieved by adding the offset to the timestamp of a particular metadata entry with the resulting value being compared to the segmentAvailableTime of content segments in the client's video buffer. The information for that metadata entry might be scheduled for presentation with the first content segment for which the sum of the offset and the metadata timestamp is later than the corresponding segmentAvailableTime.

In another example, where the timing information associated with the metadata entries is the polling time at which the content service acquires the metadata from a metadata capture service, an additional value might be introduced into the calculation to account for the delay between that polling time and the point in time at which the metadata entries are assumed to be captured. This additional value might be based, at least in part, on the polling interval used by the content service. For example, if the polling time is once every second, then one second might be added to account for this.

In another example, the client logic may use the synchronization offset to adjust a timestamp associated with each content segment (e.g., the segmentAvailableTime), compare the resulting value with the timing information of available metadata entries, and display metadata information for entries that are later in time than the offset-adjusted segment timestamp. In yet another example, adjustments might be made to the timing information associated with both the metadata and the content segments. And as discussed above, there may be cases in which the timing information associated with a metadata entry has already been accurately correlated with timing information of one or more content segments, in which case, a straight comparison without use of the offset may be appropriate. In such implementations, the client-side logic may be configured to identify such timing information so that it can decide (e.g., on a case-by-case basis) how to align each metadata entry with the broadcast content.

As will be appreciated with reference to these various examples, the manner in which the metadata and content segments are synchronized may vary depending on what each of the timing information and offset represents and how each is determined. The scope of the present disclosure should therefore not be limited by reference to the specific examples described herein.

Referring again to FIG. 5, if the streaming session terminates for some reason (e.g., origin failure), or the client device is directed to establish a new session (e.g., for load balancing) (516), the client device sends another request for the broadcast content to the content service and establishes a new session for consuming a stream of the content (504)-(508). As with the first session, the manifest information provided by the content service for the new session includes a synchronization offset for use by the client device as described herein. However, in the case where the new session originates from a different origin stack, the synchronization offset will correspond to that origin stack. Therefore, even where a failover or load balancing shift migrates a client from one origin to another, the synchronization of metadata with the broadcast content may continue in a reliable manner.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
   receiving source video content representing a live event, the source video content including one or more first timestamps representing one or more video capture times at which the source video content was captured, the first timestamps being based on a time reference;
   encoding and packaging the source video content thereby generating a first plurality of video content streams compliant with the Dynamic Adaptive Streaming over HTTP (DASH) protocol, each of the video content streams including a plurality of segments, each segment having an associated segment available time value representing a time at which the segment becomes available;
   determining a first synchronization offset representing a substantially constant time delay between one of the first timestamps representing a video capture time at which the source video content was captured and a corresponding one of the segment available time values;
   generating a first DASH manifest configured to enable client devices to request the segments of the video content streams, the first DASH manifest including the first synchronization offset;
   providing the first DASH manifest to a client device;
   receiving event metadata representing the live event, the event metadata being generated separately from the source video content, the event metadata including second timestamps based on the time reference; and
   providing the event metadata to the client device for synchronization with the segments of one or more of the video content streams using the second timestamps, the segment available time values, and the first synchronization offset.

2. The method of claim 1, wherein the first DASH manifest provided to the client device corresponds to a first origin stack, the method further comprising transitioning the client device to a second origin stack generating a second plurality of content streams from the source video content, wherein transitioning the client device to the second origin stack includes providing a second DASH manifest to the client device, the second DASH manifest including a second synchronization offset, the second synchronization offset being different from the first synchronization offset and being configured for use by the client device in synchronizing segments of the second plurality of content streams with the event metadata.

3. The method of claim 1, wherein the first synchronization offset is included in the first DASH manifest as a custom value of a DASH standard tag.

4. The method of claim 1, wherein the second timestamps represent logging times of the metadata.

5. A computer-implemented method, comprising:
   transmitting a request for first video content depicting a live event;
   receiving a first manifest configured to enable a client device to request segments of the first video content, the first manifest including a first synchronization offset representing a time difference between 1) a video capture time at which source video content, from which the first video content is derived, was captured and 2) availability of corresponding segments of the first video content;
   transmitting a request for a first segment of the first video content using the first manifest;
   receiving the first segment of the first video content, the first segment of the first video content having a first timestamp;
   transmitting a request for metadata representing the live event;
   receiving the metadata;
   identifying a first portion of the metadata for presentation with the first segment of the first video content based on the first timestamp, the first synchronization offset, and a second timestamp associated with the first portion of the metadata; and
   presenting the first segment of the first video content in conjunction with the first portion of the metadata on a display.

6. The method of claim 5, wherein the first manifest corresponds to a first origin stack, the method further comprising transitioning to a second origin stack generating second video content depicting the live event, wherein transitioning to the second origin stack includes:
   receiving a second manifest configured to enable a client device to request segments of the second video content, the second manifest including a second synchronization offset representing a time difference between capture of the source video content and availability of corresponding segments of the second video content;

transmitting a request for a second segment of the second video content using the second manifest;

receiving the second segment of the second video content, the second segment of the second video content having a third timestamp;

identifying a second portion of the metadata for presentation with the second segment of the second video content based on the third timestamp, the second synchronization offset, and a fourth timestamp associated with the second portion of the metadata; and presenting the second segment of the second video content in conjunction with the second portion of the metadata on a display.

7. The method of claim 5, wherein the first video content is compliant with the Dynamic Adaptive Streaming over HTTP (DASH) protocol, the first manifest is a DASH manifest, and the first synchronization offset is included in the DASH manifest as a custom value of a DASH standard tag.

8. The method of claim 5, wherein the first synchronization offset represents a delay between a third timestamp representing a time of capture associated with the source video content and a fourth timestamp representing a segment available time indicating a time at which a corresponding one of the segments of the first video content is available.

9. The method of claim 5, wherein the video content is compliant with the Dynamic Adaptive Streaming over HTTP (DASH) protocol.

10. The method of claim 5, wherein the second timestamp represents a logging event time associated with logging of the first portion of the metadata.

11. The method of claim 5, wherein the second timestamp represents a polling time at which a video service providing the first video content retrieved the first portion of the metadata from a metadata service.

12. The method of claim 5, wherein the second timestamp represents an inferred time derived by one or more of processing of video frames of the segments of the first video content, processing of audio data associated with the segments of the first video content, processing of caption data associated with the segments of the first video content, or processing of the metadata.

13. A computer-implemented method, comprising:
receiving source video content depicting a live event;
generating a first plurality of video content streams based on the source video content, each of the video content streams including a plurality of segments;
determining a first synchronization offset representing a time difference between a video capture time at which the source video content was captured and availability of corresponding segments of the video content streams;
generating a first manifest configured to enable client devices to request the segments of the video content streams, the first manifest including the first synchronization offset;
providing the first manifest to a client device;
receiving metadata representing the live event; and
providing the metadata to the client device for synchronization with the segments of one or more of the video content streams based on timestamps associated with the segments of the one or more video content streams, timestamps associated with the metadata, and the first synchronization offset.

14. The method of claim 13, wherein the first manifest provided to the client device corresponds to a first origin stack, the method further comprising transitioning the client device to a second origin stack generating a second plurality of content streams based on the source video content, wherein transitioning the client device to the second origin stack includes providing a second manifest to the client device, the second manifest including a second synchronization offset, the second synchronization offset being different from the first synchronization offset and being configured for use by the client device in synchronizing segments of the second plurality of content streams with the metadata.

15. The method of claim 13, wherein the video content streams are compliant with the Dynamic Adaptive Streaming over HTTP (DASH) protocol, the first manifest is a DASH manifest, and the first synchronization offset is included in the DASH manifest as a custom value of a DASH standard tag.

16. The method of claim 13, wherein the first synchronization offset represents a delay between a first timestamp associated with the source video content and a second timestamp associated with one of the segments of the video content streams.

17. The method of claim 16, wherein the video content streams are compliant with the Dynamic Adaptive Streaming over HTTP (DASH) protocol.

18. The method of claim 13, wherein the timestamps associated with the metadata represent logging event times associated with logging of the metadata.

19. The method of claim 13, wherein the timestamps associated with the metadata represent one or more polling times at which the metadata are requested from a metadata service.

20. The method of claim 13, further comprising inferring the timestamps associated with the metadata by one or more of processing of video frames of the segments of the video content streams, processing of audio data associated with the segments of the first video content, processing of caption data associated with the segments of the video content streams, or processing of the metadata.

21. The method of claim 1, the time at which the segment becomes available being a timestamp associated with a packager or calculated time value associated with a packager.

22. The method of claim 1, further comprising:
ascertaining, for at least one of the segments, the segment available time value representing the time at which the segment becomes available based, at least in part, on a timestamp representing availability of a packager.

* * * * *